(12) United States Patent
Cervantes et al.

(10) Patent No.: US 9,026,925 B2
(45) Date of Patent: May 5, 2015

(54) METHOD TO CREATE AND USE AN ASPECT ORIENTED COLOR CODING ALGORITHM FOR A GRAPHICAL USER INTERFACE

(75) Inventors: Ezequiel Cervantes, Tucson, AZ (US); Paul Anthony Jennas, II, Tucson, AZ (US); Jason Lee Peipelman, Vail, AZ (US); Matthew John Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/253,876

(22) Filed: Oct. 17, 2008

(65) Prior Publication Data

US 2010/0100833 A1    Apr. 22, 2010

(51) Int. Cl.
*G06F 3/048*    (2013.01)
*G06F 11/36*    (2006.01)
*G06F 9/44*     (2006.01)

(52) U.S. Cl.
CPC ............ *G06F 11/3688* (2013.01); *G06F 8/316* (2013.01)

(58) Field of Classification Search
USPC ........................................................ 715/764
See application file for complete search history.

(56) References Cited

U.S. PATENT DOCUMENTS

| 5,615,282 | A * | 3/1997 | Spiegel et al. ................. 382/167 |
| 7,343,563 | B2 * | 3/2008 | Muratori et al. ............... 715/772 |
| 2002/0184611 | A1 * | 12/2002 | Endejan ........................ 717/113 |
| 2005/0015732 | A1 * | 1/2005 | Vedula et al. .................. 715/805 |
| 2006/0047617 | A1 * | 3/2006 | Bacioiu et al. .................. 706/59 |
| 2006/0100975 | A1 |   5/2006 | McMaster et al. |
| 2007/0061625 | A1 * | 3/2007 | Acosta et al. ..................... 714/38 |
| 2008/0288923 | A1 * | 11/2008 | Shimogori ..................... 717/125 |
| 2009/0249021 | A1 * | 10/2009 | Morris ........................... 711/202 |

OTHER PUBLICATIONS

Eclipse AspectJ: Aspect-Oriented Programming with AspectJ and the Eclipse AspectJ Development Tools By: Adrian Colyer; Andy Clement; George Harley; Matthew Webster Publisher: Addison-Wesley Professional Pub. Date: Dec. 14, 2004; pp. 126-129, 199, 214, 313-314, 361-362.*
Print ISBN-10: 0-321-24587-3 Print ISBN-13: 978-0-321-24587-8.*

* cited by examiner

*Primary Examiner* — Anil N Kumar
(74) *Attorney, Agent, or Firm* — Dale F. Regelman; Quarles & Brady LLP

(57) ABSTRACT

A method to create an aspect oriented, color coding algorithm for a graphical user interface, wherein a graphical user interface ("GUI") is generated when a code base is executed, and wherein the GUI comprises a plurality of interactable graphical objects, wherein the method compiles the code base, identifies in the compiled code base a first object join point, wherein the compiled code base at the first object join point creates and displays a first interactable graphical object, and determines a first address in the code base for the first object join point. The method further creates a mapping table, writes the first interactable graphical object and the first address to that mapping table, and encodes the mapping table in an aspect oriented, color coding algorithm written to a computer readable medium.

10 Claims, 7 Drawing Sheets

US 9,026,925 B2

METHOD TO CREATE AND USE AN ASPECT ORIENTED COLOR CODING ALGORITHM FOR A GRAPHICAL USER INTERFACE

FIELD OF THE INVENTION

This invention relates to an apparatus and method to automate the testing of a graphical user interface.

BACKGROUND OF THE INVENTION

A graphical user interface ("GUI") facilitates interaction with a computing device. GUIs comprise interactable graphical objects, sometimes referred to as widgets, in combination with text, represent information and actions available to a user. The actions are usually initiated through direct manipulation of the interactable graphical elements.

Graphical user interfaces often include a pointer comprising a symbol that appears on a display screen and is used to select objects and commands, a pointing device comprising for example a mouse or trackball, that enables movement of the pointer, graphical interactable objects that represent commands, files, or windows. By moving the pointer to, and activating, an interactable graphical object, a user can execute a command or open a window.

Prior art methods to test a GUI are performed manually. An operator sequentially locates and activates each interactable graphical object disposed in the GUI, and determines if an expect result is observed. Such manual testing methods are cumbersome and subject to operator error.

SUMMARY OF THE INVENTION

The invention comprises a method to create an aspect oriented, color coding algorithm for a graphical user interface, and a method using that color coding algorithm to color code a plurality of interactable graphical objects encoded in a code base, wherein a graphical user interface ("GUI") is generated when the code base is executed, and wherein the GUI comprises the plurality of interactable graphical objects. The method to create an aspect oriented, color coding algorithm compiles the code base, identifies in the compiled code base a first object join point, wherein the compiled code base at the first object join point creates and displays a first interactable graphical object, and determines a first address in the code base for the first object join point. The method further creates a mapping table, writes the first interactable graphical object and the first address to that mapping table, and encodes the mapping table in an aspect oriented, color coding algorithm written to a computer readable medium.

The invention further comprises a method to color code for testing purposes a code base encoding a graphical user interface ("GUI"). The method supplies the code base and the color coding algorithm, and executes both. The color coding algorithm comprises a mapping table that identifies (N) object pointcuts, wherein the compiled code base at an (i)th object join point creates and displays an (i)th interactable graphical object, and wherein the mapping table comprises an address pointer associating an (i)th object pointcut with an (i)th object advice algorithm, wherein that (i)th object advice algorithm assigns an (i)th color to said (i)th interactable graphical object. The method executes the color coding algorithm, and for each value of (i), when the code base executes instructions associated with an (i)th object pointcut, the method executes an (i)th object advice algorithm.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams (e.g., FIGS. 1A, 1B, 1C, 2, and 3). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 1A, 1B, 1C, 2, and 3). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Graphical user interface ("GUI") design is an important adjunct to application programming. A GUI enhances the usability of the underlying logical design of a stored program. Applicants' invention comprises an automated method to test a GUI. In certain embodiments, Applicants' computer program product which encodes Applicants' testing method, is executed on the same computing device as is the GUI being tested.

Figure 4:
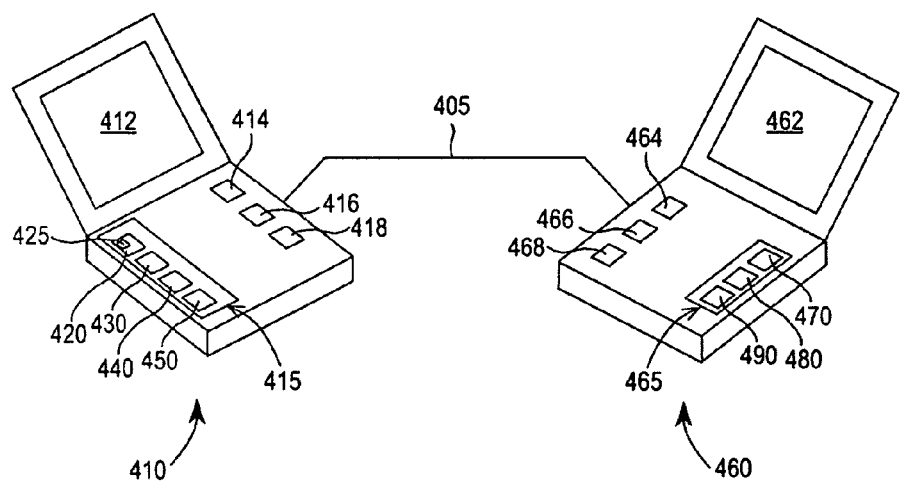
FIG. 4 is a perspective view showing the apparatus used to implement Applicants' method.

For example and referring now to FIG. 4, computing device 410 comprises processor 414, memory 415, instructions 416, and computer readable medium 418. In certain embodiments, instructions 416 arc written to memory 415. In certain embodiments, instructions 416 are written to computer readable medium 418.

In the illustrated embodiment of FIG. 4, computing device 410 further comprises code base 420 that encodes GUI 425, mapping table 430, and color-coding algorithm 440. In the illustrated embodiment of FIG. 4, code base 420 that encodes GUI 425, mapping table 430, and color-coding algorithm 440, are written to memory 415. In certain embodiments, code base 420 that encodes GUI 425, mapping table 430, and color-coding algorithm 440, are written to computer readable medium 418. In certain embodiments, mapping table 430 is integral with color-coding algorithm 440.

When code base 420 is executed, GUI 425 is generated. In certain embodiments, GUI 425 is displayed on display device 412. In other embodiments, GUI 425 is not displayed on any visual display device during testing. In certain embodiments, Applicants' color-coding algorithm is executed on a second computing device, such as computing device 460, while code base 420 is executed on first computing device 410. In the illustrated embodiment of FIG. 4, computing device 410 is interconnected with computing device 460 via communication link 405.

Further in the illustrated embodiment of FIG. 4, computing device 460 comprises processor 464, instructions 466, and computer readable medium 468, wherein instructions 466 encode Applicants' method summarized in FIGS. 1A, 1B, 1C, 2, and 3. In certain embodiments, instructions 466 are written to memory 465.

Applicants' invention comprises a method create and use an aspect oriented color coding algorithm to color code a code base which encodes a graphical user interface. U.S. patent application having Ser. No. 11/768,823, filed Jun. 26, 2007, and assigned to the common assignee hereof, hereby incorporated herein by reference, describes and claims a method to test a GUI generated by a color coded code base formed using the invention described and claimed herein. The '823 Application describes Applicants' method to automate the testing of a graphical user interface encoded by a code base, after the code base that generates that GUI has been "color coded."

Figure 1:
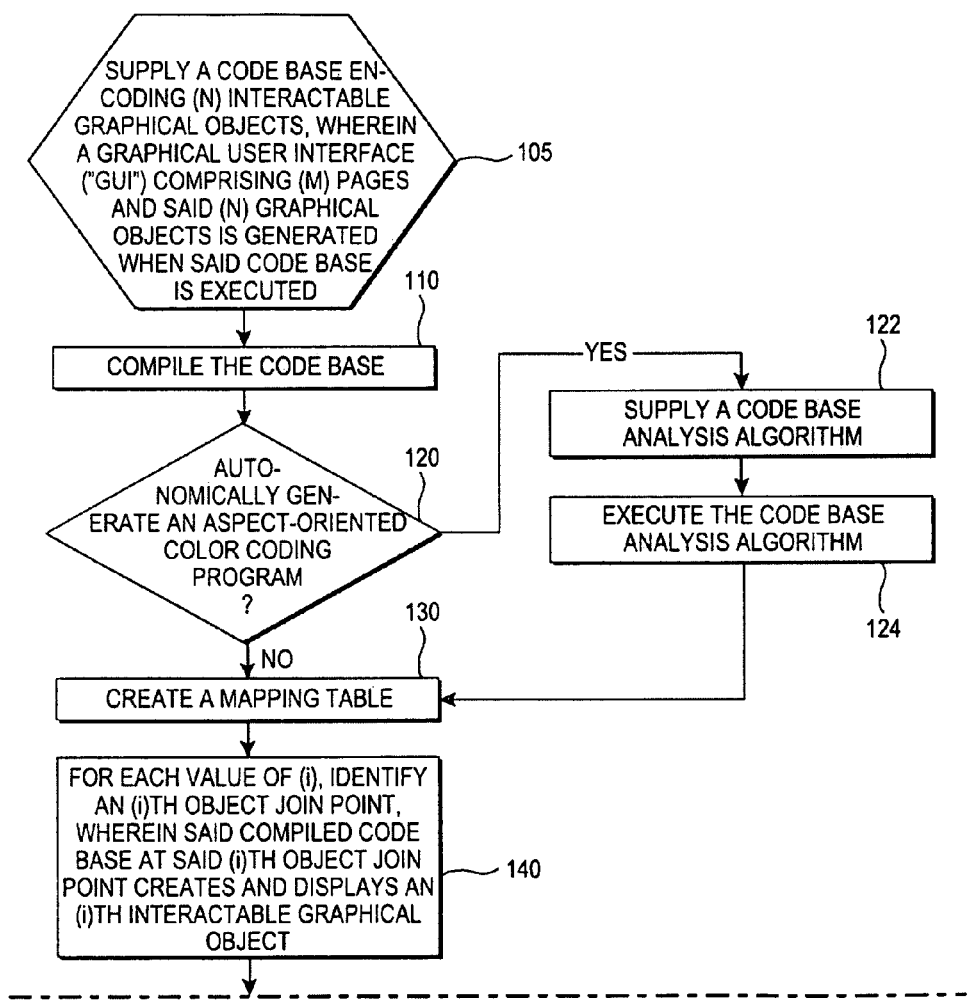
FIG. 1 is a flow chart summarizing certain initial steps of Applicants' method.

Referring now to FIG. 1, in step 105 the method supplies a code base encoding a plurality of interactable graphical objects, where that code base when executed generates a graphical user interface ("GUI") that comprises that plurality of interactable graphical objects in a plurality of GUI pages. In certain embodiments, the code base of step 105 encodes (N) interactable graphical objects, wherein (N) is greater than or equal to 1, where that code base when executed generates a GUI comprising (M) GUI pages, wherein (M) is greater than or equal to 1.

In step 110, the method compiles the code base of step 110. In certain embodiments, the code base of step 110 is encoded in a computer readable medium disposed in a computing device, such as computing device 410 (FIG. 4) or 420 (FIG. 4), wherein that computing device performs step 110.

In step 120, the method determines whether to autonomically generate an aspect-oriented color coding algorithm. In certain embodiments, step 120 is manually performed by a software programming engineer.

Figure 1A:
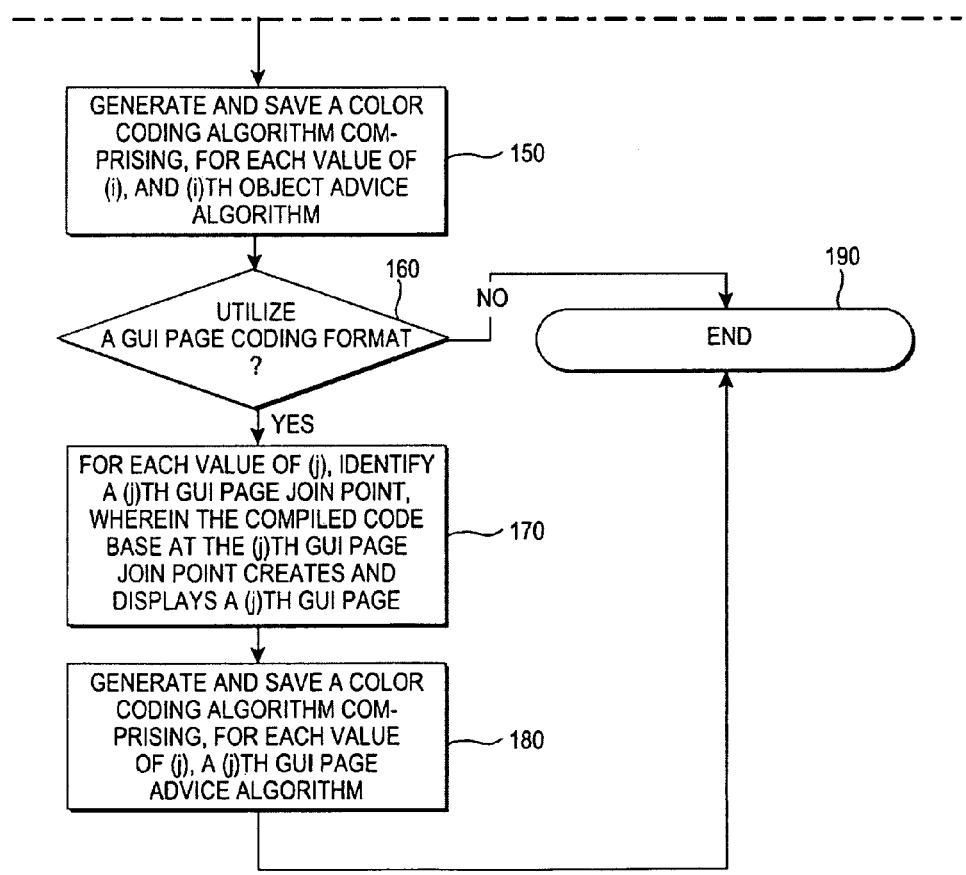
FIG. 1A is a flow chart summarizing additional steps of Applicants' method.
Figure 1B:
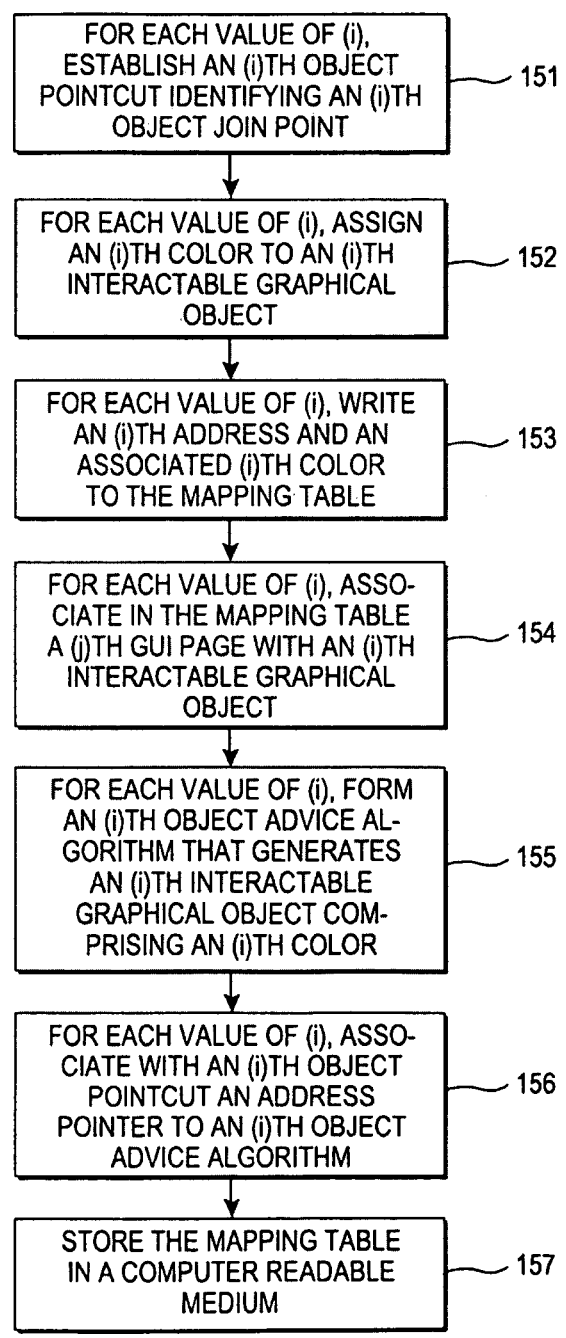
FIG. 1B is a flow chart summarizing certain additional steps of Applicants' method.
Figure 1C:
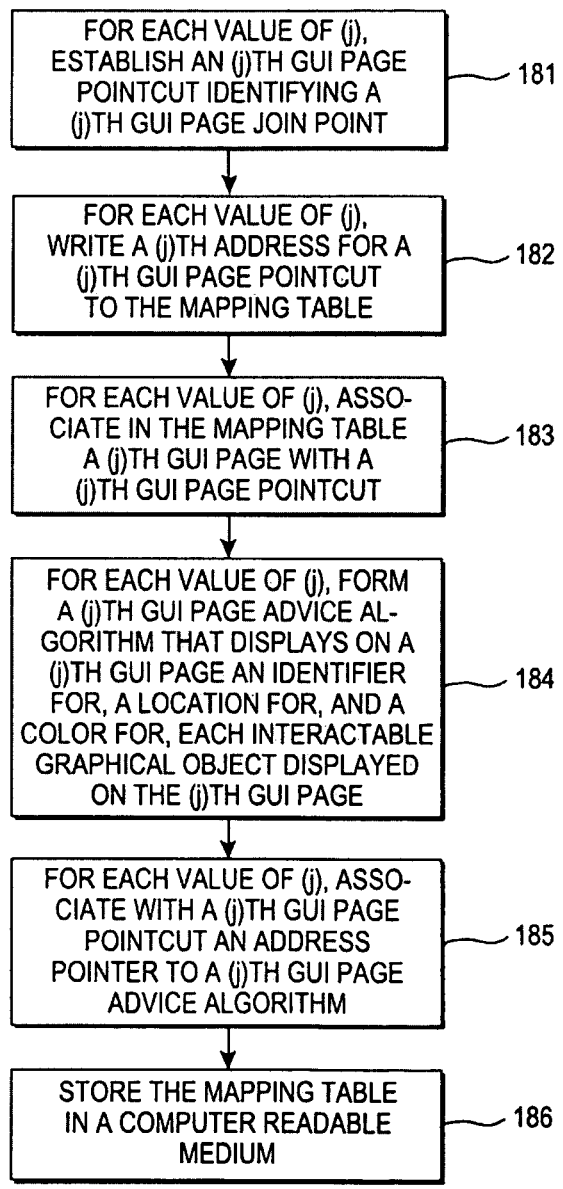
FIG. 1C is a flow chart summarizing certain additional steps of Applicants' method.

If the method elects in step 120 to autonomically generate an aspect-oriented color coding algorithm, then the method transitions from step 120 to step 122 wherein the method supplies instructions to implement Applicants' method of FIGS. 1A, 1B, and 1C. The method transitions from step 122 to step 124 wherein the method, utilizing a processor, such as processor 414 (FIG. 4) and/or 464 (FIG. 4), executes instructions 416 and/or 466, to generate Applicants' color coding algorithm. The method transitions from step 124 to step 130.

If the method elects in step 120 not to autonomically generate an aspect-oriented color coding algorithm, then the method transitions from step 120 to step 130 wherein the method creates an mapping table. In certain embodiments, step 130 is manually performed by a software programming engineer. In certain embodiments, step 130 is performed using the instructions of step 122.

In step 140, the method identifies a plurality of object join points in the complied code base, wherein the compiled code base at each join point creates an interactable graphical object. In certain embodiments, wherein the code base encodes (N) interactable graphical objects, in step 140 the method identifies an (i)th object join point in the compiled code base, wherein the compiled code base creates an (i)th interactable graphical object at that (i)th join point. In certain embodiments, step 140 is manually performed by a software programming engineer. In certain embodiments, step 140 is performed using the instructions of step 122.

In step 150, the method creates and saves a color coding algorithm comprising a plurality of object advice algorithms, wherein each object advice algorithm is associated with one or more of the object join points, and wherein each object advice algorithm comprises instructions to color code an interactable graphical object created at one or more join points in the code base. In certain embodiments, step 150 is manually performed by a software programming engineer. In certain embodiments, step 150 is performed using the instructions of step 122.

In certain embodiments step 150 comprises the steps recited in FIG. 1B. Referring now to FIG. 1B, in step 151 the method, for each value of (i), establishes an (i)th pointcut, wherein that (i)th pointcut identifies an (i)th join point, wherein (i) is greater than or equal to 1 and less than or equal to (N). In certain embodiments, step 151 comprises identifying an (i)th address in the code base wherein the code base comprises computer readable program code to form an (i)th interactable graphical object. In certain embodiments, step 151 comprises adding a function call in the code base at the (i)th address, wherein that (i)th function call causes the execution of an (i)th object advice algorithm. In certain embodiments, step 151 is manually performed by a software programming engineer. In certain embodiments, step 151 is performed using the instructions of step 122.

In step 152, the method, for each value of (i), assigns an (i)th color to an (i)th interactable graphical object. In certain embodiments, the (i)th color differs from each of the other (N−1) colors assigned to the other (N−1) interactable graphical objects encoded by the code base of step 105. By "differs from," Applicants mean each of the (N) colors is uniquely identifiable using color-identifying instrumentation, i.e. a colorimeter. In certain embodiments, step 151 is manually performed by a software programming engineer. In certain embodiments, step 151 is performed using the instructions of step 122.

In step 153, the method, for each value of (i), writes an (i)th address of step 151 and an (i)th color of step 152, to the mapping table of step 130. In certain embodiments, step 153 is manually performed by a software programming engineer. In certain embodiments, step 153 is performed using the instructions of step 122.

In step 154, the method, for each value of (i), associates in the mapping table a (j)th GUI page with an (i)th interactable graphical object, wherein the (i)th interactable object is displayed on the (j)th GUI page. In certain embodiments, step 154 is manually performed by a software programming engineer. In certain embodiments, step 154 is performed using the instructions of step 122.

In step 155, for each value of (i), the method generates and saves an (i)th object advice algorithm that generates an (i)th interactable graphical object comprising an (i)th color. In certain embodiments, step 154 is manually performed by a software programming engineer. In certain embodiments, step 154 is performed using the instructions of step 122.

In step 156, the method, for each value of (i), associates with an (i)th pointcut an address pointer to an (i)th object advice algorithm. In certain embodiments, step 156 is manually performed by a software programming engineer. In certain embodiments, step 156 is performed using the instructions of step 122.

In step 157, the method stores the mapping table in a computer readable medium. In certain embodiments, step 157 is manually performed by a software programming engineer. In certain embodiments, step 157 is performed using the instructions of step 122.

Referring once again to FIG. 1A, in step 160 the method determines whether to utilize a GUI page coding format. In certain embodiments, step 160 is manually performed by a software programming engineer. In certain embodiments, step 160 is performed using the instructions of step 122.

If the method determines in step 160 not to utilize a GUI page coding format, then the method transitions from step 160 to step 190 and ends. Alternatively, if the method determines in step 160 to utilize a GUI page coding format, then the method transitions from step 160 to step 170 wherein the method identifies a plurality of GUI page join points in the complied code base, wherein the compiled code base at each GUI page join point displays a different GUI page. In certain embodiments, wherein the code base encodes (M) GUI pages, in step 170 the method identifies, for each value of (j), a (j)th GUI page join point in the compiled code base, wherein the compiled code base displays a (j)th GUI page that (j)th GUI page join point, wherein (j) is greater than or equal to 1 and less than or equal to (M). In certain embodiments, step 170 is manually performed by a software programming engineer. In certain embodiments, step 170 is performed using the instructions of step 122.

In step 180, the method, creates and saves a color coding algorithm that comprises, for each value of (j), a (j)th GUI page advice algorithm, wherein a (j)th GUI page advice algorithm is associated with a (j)th GUI page join point, and wherein a (j)th GUI page advice algorithm comprises computer readable program code to display a (j)th GUI page. In certain embodiments, step 180 is manually performed by a software programming engineer. In certain embodiments, step 180 is performed using the instructions of step 122.

In certain embodiments step 180 comprises the steps recited in FIG. 1C. Referring now to FIG. 1C, in step 181 the method, for each value of (j), establishes an (j)th pointcut, wherein that (j)th pointcut identifies an (j)th join point, wherein (j) is greater than or equal to 1 and less than or equal to (M), wherein the code base of step 105 encodes (M) GUI pages. In certain embodiments, step 181 comprises identifying an (j)th address in the code base wherein the code base comprises computer readable program code to display a (j)th GUI page. In certain embodiments, step 181 comprises adding a function call in the code base at the (j)th address, wherein that (j)th function call causes the execution of an (j)th GUI page advice algorithm. In certain embodiments, step 181 is manually performed by a software programming engineer. In certain embodiments, step 181 is performed using the instructions of step 122.

In step 182, the method, for each value of (j), writes a (j)th address of step 181 to the mapping table of step 130. In certain embodiments, step 182 is manually performed by a software programming engineer. In certain embodiments, step 182 is performed using the instructions of step 122.

In step 183, the method, for each value of (j), associates in the mapping table a (j)th GUI page with an (j)th pointcut. In certain embodiments, step 183 is manually performed by a software programming engineer. In certain embodiments, step 183 is performed using the instructions of step 122.

In step 184, the method generates and saves, for each value of (j), an (j)th GUI page advice algorithm that displays on a (j)th GUI page a listing that recites each interactable graphical object displayed on the (j)th GUI page, a unique color assigned to interactable graphical object displayed on the (j)th GUI page, and a location on the (j)th GUI page for each interactable graphical object displayed on the (j)th GUI page. In certain embodiments, step 184 is manually performed by a software programming engineer. In certain embodiments, step 184 is performed using the instructions of step 122.

In step 185, the method, for each value of (j), associates with a (j)th pointcut an address pointer to an (j)th object advice algorithm. In certain embodiments, step 185 is manually performed by a software programming engineer. In certain embodiments, step 185 is performed using the instructions of step 122.

In step 186, the method stores the updated mapping table in a computer readable medium. In certain embodiments, step 186 is manually performed by a software programming engineer. In certain embodiments, step 186 is performed using the instructions of step 122.

Figure 2:
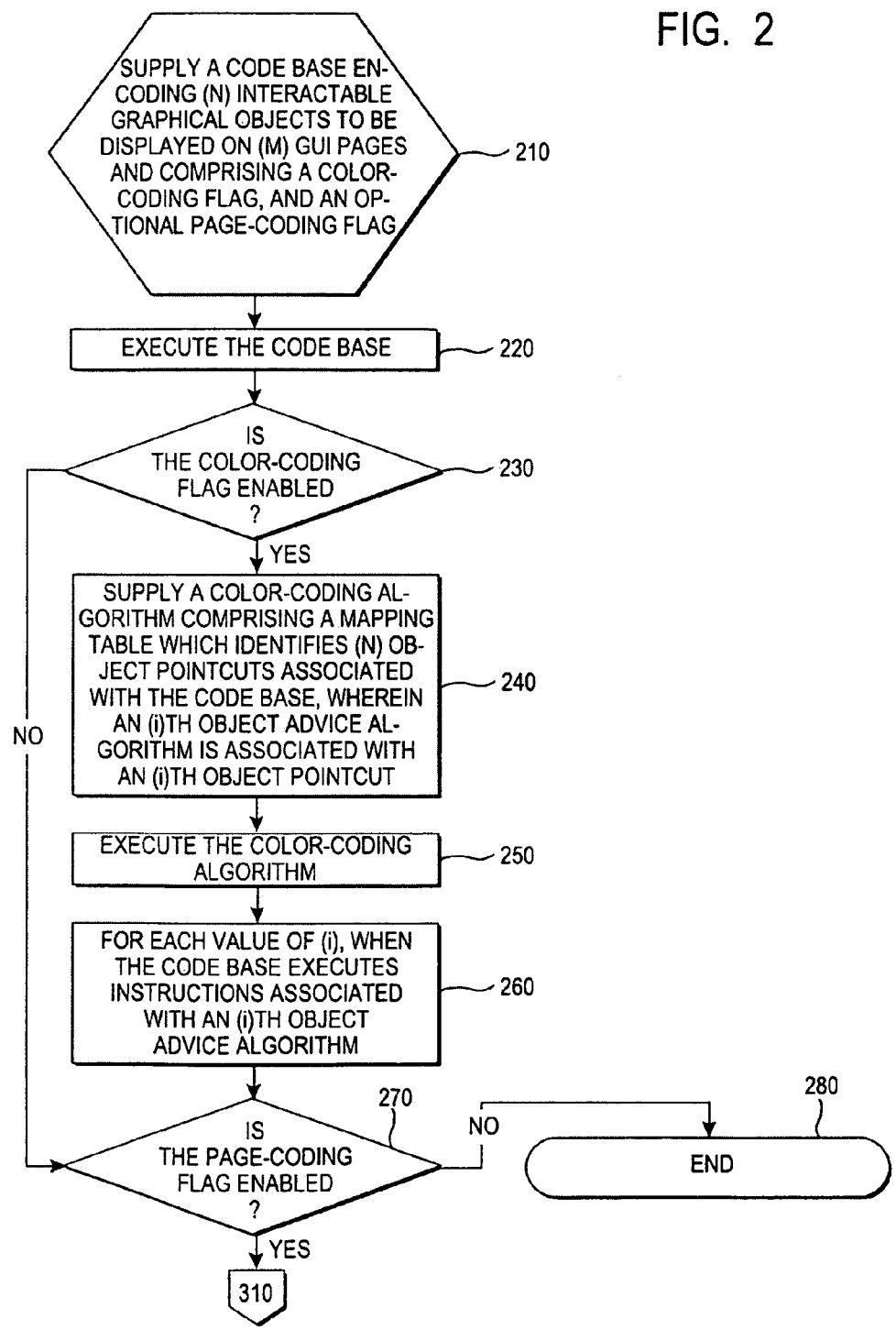
FIG. 2 is a flow chart summarizing additional steps of Applicants' method.

Applicants' invention further comprises a method to utilize the color coding algorithm formed using the method of FIGS. 1A, 1B, and 1C. In certain embodiments, that color coding algorithm comprises the mapping table of step 130, as revised in steps 157 and 186, (N) object pointcuts, (N) object,advice algorithms, (M) GUI Page pointcuts, and (M) GUI Page advice algorithms. Referring now to FIG. 2, in step 210 the method provides the code base of step 105, wherein that code base encodes (N) interactable graphical objects to be displayed on (M) GUI pages, wherein the code base further comprises a color-coding flag, and optionally a page-coding flag.

In certain embodiments, the color-coding flag comprises a bit map, wherein the bit map recites first information if use of a color coding algorithm is selected, or second information if use of a color coding algorithm is not selected. In certain embodiments, the color-coding flag comprises designated bit, wherein the bit is encoded with a "1" if use of a color coding algorithm is selected, or a "0" if use of a color coding algorithm is not selected.

In certain embodiments, the page-coding flag comprises a bit map, wherein the bit map recites first information if use of a page coding algorithm is selected, or second information if use of a page coding algorithm is not selected. In certain embodiments, the page-coding flag comprises designated bit, wherein the bit is encoded with a "1" if use of a page coding algorithm is selected, or a "0" if use of a page coding algorithm is not selected.

In step 220, the method executes the code base. In certain embodiments, step 220 is manually performed by a software programming engineer. In certain embodiments, step 220 is performed by a GUI testing algorithm.

In step 230, the method determines if a color-coding flag disposed in the code base of step 210 is enabled. In certain embodiments, step 230 is manually performed by a software programming engineer. In certain embodiments, step 230 is performed by a GUI testing algorithm.

If the method determines in step 230 that a color-coding flag disposed in the code base of step 210 is not enabled, then the method transitions from step 230 to step 270. Alternatively, if the method determines in step 230 that a color-coding flag disposed in the code base of step 210 is enabled, then the method transitions from step 230 to step 240 wherein the method supplies a color-coding algorithm comprising the mapping table of step 130 (FIG. 1A), as revised in step 157 (FIG. 1B) and/or step 186 (FIG. 1C), wherein that mapping table identifies (N) object pointcuts associated with the code base of step 210, wherein an (i)th object advice algorithm is associated with an (i)th object pointcut. In certain embodiments, step 240 is manually performed by a software programming engineer. In certain embodiments, step 240 is performed by a GUI testing algorithm.

In step 250, the method executes the color-coding algorithm of step 240. In certain embodiments, step 250 is manually performed by a software programming engineer. In certain embodiments, step 250 is performed by a GUI testing algorithm.

In step 260, when, for each value of (i), the code base executes instructions associated with an (i)th object pointcut, the method executes an (i)th object advice algorithm. In certain embodiments, step 260 is manually performed by a software programming engineer. In certain embodiments, step 260 is performed by a GUI testing algorithm.

In step 270, the method determines if a page coding flag is enabled. In certain embodiments, step 270 is manually performed by a software programming engineer. In certain embodiments, step 270 is performed by a GUI testing algorithm.

If the method determines in step 270 that the code base of step 210 does not comprise a page coding flag, or that a page coding flag is not enabled, then the method transitions from step 270 to step 280 and ends. The code base of step 210 is now color coded and ready for automated GUI testing as described and claimed in the '823 Application, which is incorporated by reference herein.

Alternatively, if the method determines in step 270 that a page coding flag disposed in the code base of step 210 is enabled, then the method transitions from step 270 to step 310 wherein the method supplies a GUI page coding algorithm comprising the mapping table of step 130 (FIG. 1A), as revised in step 157 (FIG. 1B) and/or step 186 (FIG. 1C), wherein that mapping table identifies (M) GUI Page pointcuts associated with the code base of step 210, wherein an (j)th GUI Page advice algorithm is associated with a (j)th GUI Page pointcut. In certain embodiments, step 310 is manually performed by a software programming engineer. In certain embodiments, step 310 is performed by a GUI testing algorithm.

In step 320, the method executes the GUI Page-coding algorithm of step 310. In certain embodiments, step 320 is manually performed by a software programming engineer. In certain embodiments, step 320 is performed by a GUI testing algorithm.

In step 330, when, for each value of (j), the code base executes instructions associated with a (j)th GUI Page pointcut, the method executes a (j)th GUI Page advice algorithm. In certain embodiments, step 330 is manually performed by a software programming engineer. In certain embodiments, step 330 is performed by a GUI testing algorithm. The method transitions from step 330 to step 340 and ends. The code base of step 210 is now color coded, and page coded, and is ready for automated GUI testing as described and claimed in the '823 Application, which is incorporated by reference herein.

Figure 3:
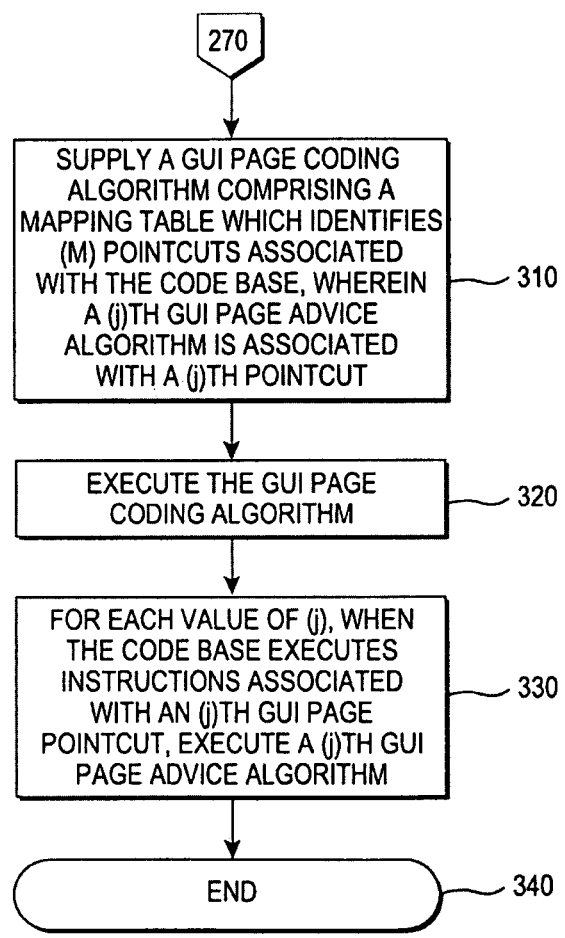
FIG. 3 is a flow chart summarizing additional steps of Applicants' method.

In certain embodiments, individual steps recited in FIG. 1A, and/or FIG. 1B, and/or FIG. 1C, and/or FIG. 2, and/or FIG. 3, may be combined, eliminated, or reordered.

In certain embodiments, Applicants' invention includes instructions, such as instructions 416 (FIG. 4) and/or 466 (FIG. 4), residing in computer readable medium, such as for example memory 415 (FIG. 4) or memory 465 (FIG. 4), wherein those instructions are executed by a processor, such as processor 414 (FIG. 4) or processor 464 (FIG. 4), respectively, to perform one or more of steps 120, 130, 140, 150, 160, 170, 180, 185, and/or 190, recited in FIG. 1, and/or one or more of steps 210, 220, 230, 240, and/or 250, recited in FIG. 2, and/or one or more of steps 310, 320, 330, 340, 350, 360, 370, 380, and/or 390, recited in FIG. 3.

In other embodiments, Applicants' invention includes instructions, such as instructions 416 (FIG. 4) and/or 466 (FIG. 4), residing in any other computer program product, where those instructions are executed by a computer external to, or internal to, system 100, to perform one or more of steps 120, 130, 140, 150, 160, 170, 180, 185, and/or 190, recited in FIG. 1, and/or one or more of steps 210, 220, 230, 240, and/or 250, recited in FIG. 2, and/or one or more of steps 310, 320, 330, 340, 350, 360, 370, 380, and/or 390, recited in FIG. 3. In either case, the instructions may be encoded in an information storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to color code a code base encoding a graphical user interface ("GUI") for testing purposes, comprising:
   supplying a code base comprising a color-coding flag and written to a first non-transitory computer readable medium disposed in a first computing device and encoding a plurality of interactable graphical objects, wherein a graphical user interface ("GUI") is generated when said code base is executed, and wherein said GUI comprises said plurality of interactable graphical objects in a plurality of GUI pages;
   determining if said color-coding flag is enabled;
   operative if said color-coding flag is enabled, executing said code base to generate said GUI, wherein said GUI is not displayed on a visual display device;
   supplying a color coding algorithm written to a second non-transitory computer readable medium disposed in a second computing device, wherein said first computing device is in communication with said second computing device, said color coding algorithm comprising a mapping table for said code base, wherein said mapping table comprises an address pointer associating each object pointcut with an associated object advice algorithm, wherein said mapping table identifies (N) object pointcuts, wherein said compiled code base at an (i)th object join point creates and displays an (i)th interactable graphical object, and wherein said mapping table recites each address in the code base wherein the code base comprises computer readable program code to form an interactable graphical object, a GUI page number for each interactable graphical object, an address pointer associating an (i)th object pointcut with an (i)th object advice algorithm, wherein said (i)th object advice algorithm assigns an (i)th color to said (i)th interactable graphical object; wherein (i) is greater than or equal to 0 and less than or equal to (N), and wherein said (i)th color differs from each of the other (N−1) colors and is uniquely identifiable using a colorimeter;

executing said color coding algorithm;

for each value of (i), when the code base executes instructions associated with an (i)th object pointcut, executing an (i)th object advice algorithm.

2. The method of claim 1, wherein said color-coding flag comprises a bit comprising a first value or a second value.

3. The method of claim 1, wherein said mapping table identifies (M) GUI Page pointcuts, wherein said code base at a (j)th GUI Page join point creates and displays a (j)th GUI page, and wherein said mapping table comprises an address pointer associating an (j)th GUI Page pointcut with a (j)th GUI Page advice algorithm, wherein a (j)th GUI Page advice algorithm displays on a (j)th GUI page an identifier for, a location for, and a color for, each interactable graphical object displayed on the (j)th GUI page wherein (j) is greater than or equal to 0 and less than or equal to (M), said method further comprising for each value of (j), when the code base executes instructions associated with an (j)th GUI Page pointcut, executing a (j)th object GUI Page algorithm.

4. The method of claim 3, wherein said code base comprises a page-coding flag, further comprising:

determining if said page-coding flag is enabled;

operative if said page-coding flag is enabled, performing said executing steps.

5. The method of claim 4, wherein said page-coding flag comprises a bit comprising a first value or a second value.

6. A computing device comprising a hardware processor and a non-transitory computer readable medium comprising computer readable program code disposed therein to color code a code base encoding a graphical user interface ("GUI") for testing purposes, the computer readable program code comprising a series of computer readable program steps to effect:

executing a code base comprising a color-coding flag and written to a first non-transitory computer readable medium disposed on a first computing device, and encoding a plurality of interactable graphical objects, wherein a graphical user interface ("GUI") is generated when said code base is executed, and wherein said GUI comprises said plurality of interactable graphical objects in a plurality of GUI pages, and wherein said GUI is not displayed on a visual display device;

determining if said color-coding flag is enabled;

operative if said color-coding flag is enabled, executing a color coding algorithm written to a second non-transitory computer readable medium disposed in a second computing device, wherein said first computing device and said second computing device are in communication, said color coding algorithm comprising a mapping table, wherein said mapping table identifies (N) object pointcuts encoded in said code base, wherein said mapping table comprises an address pointer associating each object pointcut with an associated object advice algorithm, wherein said compiled code base at an (i)th object join point creates and displays an (i)th interactable graphical object, and wherein said mapping table recites each address in the code base wherein the code base comprises computer readable program code to from an interactable graphical object, a GUI page number for each interactable graphical object, an address pointer associating an (i)th object pointcut with an (i)th object advice algorithm, wherein said (i)th object advice algorithm assigns an (i)th color to said (i)th interactable graphical object;

wherein (i) is greater than or equal to 0 and less than or equal to (N), and wherein said (i)th color differs from each of the other (N−1) colors and is uniquely identifiable using a colorimeter;

for each value of (i), when the code base executes instructions associated with an (i)th object pointcut, executing an (i)th object advice algorithm.

7. The computing device of claim 6, wherein said color-coding flag comprises a bit comprising a first value or a second value.

8. The computing device of claim 6, wherein said mapping table identifies (M) GUI Page pointcuts, wherein said code base at a (j)th GUI Page join point creates and displays a (j)th GUI page, and wherein said mapping table comprises an address pointer associating an (j)th GUI Page pointcut with a (j)th GUI Page advice algorithm, wherein a (j)th GUI Page advice algorithm displays on a (j)th GUI page an identifier for, a location for, and a color for, each interactable graphical object displayed on the (j)th GUI page wherein (j) is greater than or equal to 0 and less than or equal to (M), said computer readable program code further comprising a series of computer readable program steps to effect:

for each value of (j), when the code base executes instructions associated with an (j)th GUI Page pointcut, executing a (j)th object GUI Page algorithm.

9. The computing device of claim 8, wherein said code base comprises a page-coding flag, said computer readable program code further comprising a series of computer readable program steps to effect:

determining if said page-coding flag is enabled;

operative if said page-coding flag is enabled, executing said color coding algorithm.

10. The computing device of claim 9, wherein said page-coding flag comprises a bit comprising a first value or a second value.

* * * * *